Aug. 19, 1924.                                            1,505,440
C. SMITH
ATTACHING LINK FOR TIRE CHAINS
Filed June 28, 1923
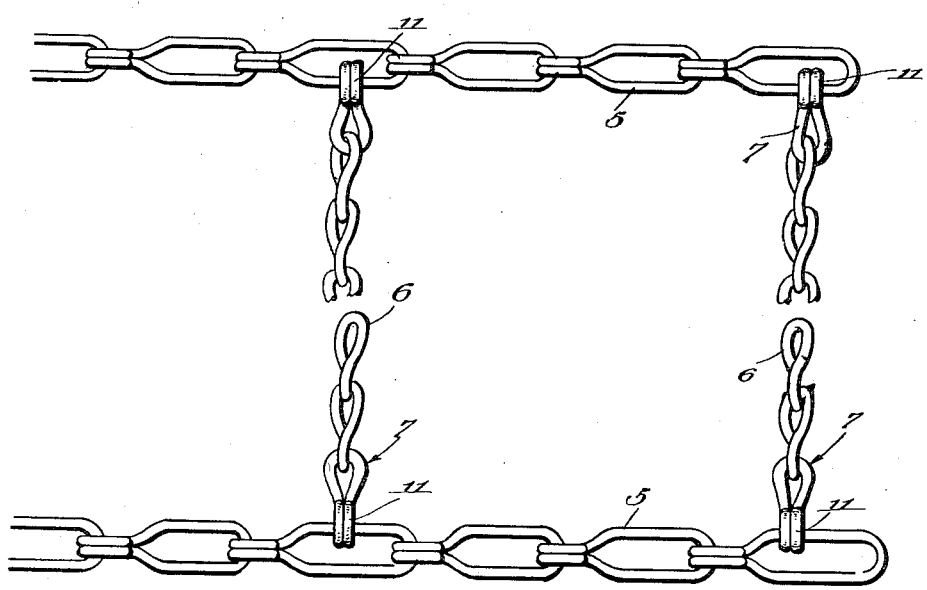
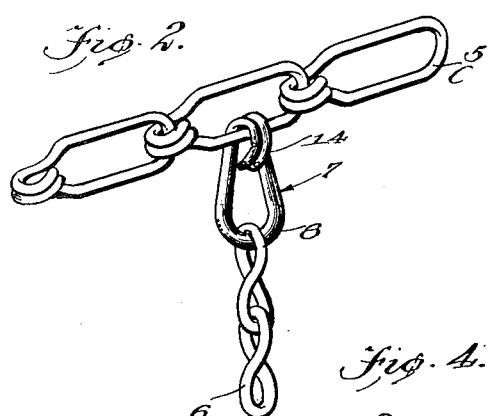
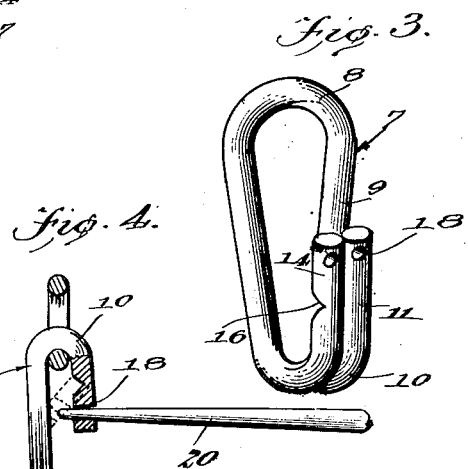
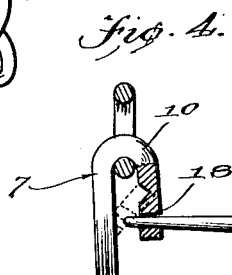
WITNESSES
INVENTOR
Charles Smith,
BY
ATTORNEYS Patented Aug. 19, 1924.

1,505,440

UNITED STATES PATENT OFFICE.

CHARLES SMITH, OF DULUTH, MINNESOTA.

ATTACHING LINK FOR TIRE CHAINS.

Application filed June 28, 1923. Serial No. 648,291.

*To all whom it may concern:*

Be it known that I, CHARLES SMITH, a citizen of the United States, and resident of Duluth, in the county of St. Louis and State of Minnesota, have invented certain new and useful Improvements in Attaching Links for Tire Chains, of which the following is a specification.

This invention relates to anti-skid devices and more particularly to a means for connecting the cross chains to the circumferential chains.

Briefly stated an important object is to provide an attaching link wherein the ends of the same are somewhat weakened so that the same may with the aid of a suitable tool be bent inwardly for securely connecting the side chains to the circumferential chains.

Further the invention forming the subject matter of this application aims to provide a fastening link for skid chains having simple means whereby the same may be disconnected from the circumferential chains, regardless of the size or degree of hardness of the chains.

Further the invention aims to provide an attaching link which may be removed or applied quite as easily when the skid chain is on the wheel as when it is off.

A further object is to provide an attaching link of the character specified which is of highly simplified construction, durable in use and cheap to manufacture.

Other objects and advantages will be apparent during the course of the following description.

In the accompanying drawing, forming a part of this application, and in which like numerals are employed to designate like parts throughout the same, Figure 1 is a fragmentary plan view of a non-skid chain equipped with the improved attaching links.

Figure 2 is a perspective of one of the attaching links applied.

Figure 3 is a perspective of one of the attaching links in its open position.

Figure 4 is a vertical sectional view through the attaching link applied, the view illustrating the means whereby the weakened portion may be moved inwardly and outwardly by the aid of a tool.

In the drawing wherein for the purpose of illustration is shown a preferred embodiment of the invention, the numerals 4 and 5 designate the side chains of an anti-skid device or attachment which as well known is designed to be applied to a pneumatic or solid tire to prevent skidding.

The cross chains are designated by the numeral 6 and are attached to the links of the circumferential chains by attaching links of a strength to correspond to the strength of the other links and in this case the said attaching links are designated by the numeral 7.

The improved attaching link is formed from a single length of suitably stout and hard metal bent intermediate its ends as indicated at 8 to provide a pair of arms 9, the intermediate portions of which are formed with return bends 10 which define bills 11 which engage the links of the side chains. The sides or arms 9 converge toward the bend 10 so that the bills 11 lie close together for contact with the sides of the links of the circumferential chains.

Attention is directed to the fact that the bills 11 are long enough to extend considerably beyond the portions of the circumferential chains which they engage and the terminal portions of the said links may be bent inwardly as illustrated in Figure 2 so as to securely and positively prevent the disconnection of the cross chains from the circumferential chains. To facilitate the inward bending of the terminal portions 14 the inner sides of the bills are formed with V-shaped notches 16 which decreases the cross sectional area of each bill and consequently the resisting power of the same, so that the said terminal portions 14 may be bent inwardly without the exercise of great force. Also by forming the notches 16 on the inner sides of the bills 11 the material is not in any way crowded at this point, another feature which enables the weakened terminal portions 14 to be bent inwardly with the exercise of but a small amount of force.

In carrying out the invention the weakened terminal portions 14 may be formed with transverse openings 18 extending out through the outer sides thereof and adapted for the reception of a tool, such as a punch 20 whereby the said weakened portions may be forced inwardly. It will be seen that by manually grasping the terminal portions of the punch 20 the same may be employed as a lever for forcing the weakened terminal portions 14 inwardly so as to prevent the disconnection of the attaching link 7 from the circumferential chains.

By the arrangement illustrated, the accidental disconnection of the cross chains from the side chains is positively prevented and it will be seen that the ends of the weakened terminal portions 14 are located between the diverging arms 9 and are protected thereby from engagement with other portions of the chain and with various objects with which the same may come in contact.

The improved attaching link may be employed either in originally connecting the cross chains to the side chains or in repairing the anti-skid device. It will be noted that the attaching links may be efficiently employed for connecting the cross chains to the side chains without removing the anti-skid device from the tire.

Also regardless of the size of the attaching link all of the weakened portions may be moved inwardly with a uniform effort. That is to say, on a small link or one having a rather small cross sectional area only a small notch is formed while on a large link or one formed from rather stout metal a larger notch is formed so that the terminal portions may be swung inwardly without the exercise of a large amount of force.

Having thus described the invention, what is claimed is:—

1. An attaching link formed from a single length of metal bent intermediate its ends to define a pair of arms, the terminal portions of which are formed with return bends defining bills, said bills being formed with notches intermediate their ends by means of which the ends of the bills may be forced inwardly.

2. An attaching link formed from a single length of metal bent intermediate its ends to define a pair of arms, the terminal portions of which are formed with return bends defining bills, said bills being formed with notches intermediate their ends by means of which the ends of the bills may be forced inwardly, the terminal portions of said bills being formed with openings for the reception of a lever by means of which the terminal portions of the bills may be bent inwardly.

3. An attaching link for anti-skid chains comprising a single length of metal bent intermediate its ends to provide a pair of converging side arms, the terminal portions of which are formed with return bends adapted to be engaged with the side chain links of an anti-skid chain and defining bills, said bills being formed intermediate their ends and at points substantially beyond said bends and the material engaged thereby with notches reducing the cross sectional area of the length of metal whereby the terminal portions of the bills may be swung inwardly.

4. An attaching link for anti-skid chains comprising a single length of metal bent intermediate its ends to provide a pair of converging side arms, the terminal portions of which are formed with return bends adapted to be engaged with the side chain links of an anti-skid chain and defining bills, said bills being formed intermediate their ends and at points substantially beyond said bends and the material engaged thereby with notches reducing the cross sectional area of the length of metal whereby the terminal portions of the bills may be swung inwardly, said notches being located on the inner sides of the bills whereby the displaced material allows the terminal portions of the arms to be bent inwardly.

5. An attaching link for anti-skid chains comprising a single length of metal bent intermediate its ends to provide a pair of converging side arms, the terminal portions of which are formed with return bends adapted to be engaged with the side chain links of an anti-skid chain and defining bills, said bills being formed intermediate their ends and at points substantially beyond said bends and the material engaged thereby with notches reducing the cross sectional area of the length of metal whereby the terminal portions of the bills may be swung inwardly, said notches being located on the inner sides of the bills whereby the displaced material allows the terminal portions of the arms to be bent inwardly, the terminal portions of the bills being formed with openings extending entirely therethrough and adapted for the reception of a lever by means of which the terminal portions of the bills may be bent inwardly.

CHARLES SMITH.